June 29, 1937.    S. R. PUFFER    2,085,604
COOLING MEANS FOR AIRCRAFT ENGINES
Filed July 28, 1934

Inventor:
Samuel R. Puffer,
by Harry E. Dunham
His Attorney.

Patented June 29, 1937

2,085,604

UNITED STATES PATENT OFFICE 2,085,604

COOLING MEANS FOR AIRCRAFT ENGINES

Samuel R. Puffer, Saugus, Mass., assignor to General Electric Company, a corporation of New York Application July 28, 1934, Serial No. 737,411

3 Claims. (Cl. 123—171)

The present invention relates to cooling means for aircraft internal combustion engines and is especially applicable to aircraft engines of the radial air-cooled type, although it is not limited thereto necessarily.

In connection with the operation of radial air-cooled aircraft engines, difficulty is experienced often in obtaining proper cooling, especially when the plane is climbing, because of the low air velocity past the plane, and this difficulty is aggravated in the case of two-row radial engines where the power output is very high and the diameter small.

It has been the practice heretofore in aeroplane construction to so locate the engine that it is exposed directly to the air blast from the propeller, there being no wall between the engine and the central portion of the propeller, and to depend upon the blast of air from the central portion of the propeller plus the flow of air due to the forward motion of the aeroplane to effect cooling of the engine. However, propeller hubs, for some distance from the engine shaft, have no pitch and in addition tend to throw air radially outward due to centrifugal action with the result that not a great flow of cooling air is effected by the action of the propeller and hence most of the cooling has been effected due to the flow of air caused by the forward movement of the aeroplane.

The object of the present invention is to provide an improved construction and arrangement for cooling aircraft engines of the type referred to, and for a consideration of what I believe to be novel and my invention, attention is directed to the following specification and the claims appended thereto.

Figure 1:
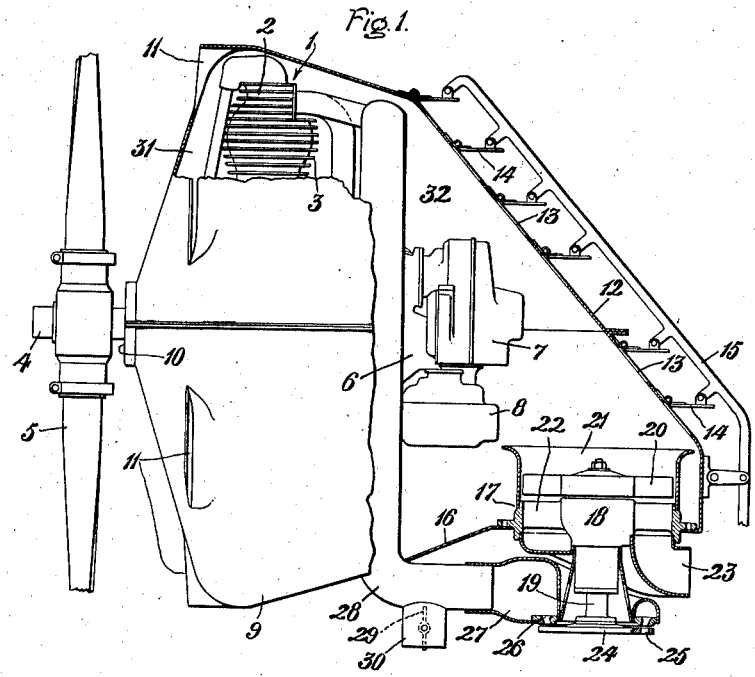
Figure 2:
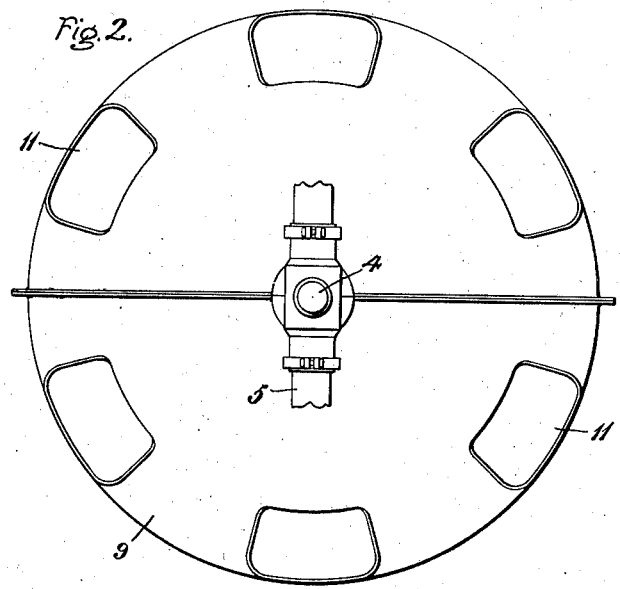

In the drawing, Fig. 1 is a side elevation, with parts broken away, and certain parts in section, of a radial type air-cooled aircraft engine provided with cooling means embodying my invention, and Fig. 2 is a front view thereof, the propeller being for the most part broken away.

Referring to the drawing, 1 indicates an aeroplane engine having a plurality of radial cylinders 2 provided with cooling fins 3. Only one of the cylinders is shown in the drawing but it will be understood that there are a number of cylinders radially disposed around the shaft, there being V-shaped spaces between the cylinders through which cooling air may flow and in which baffles may be located for directing air over the cylinders. The shaft for the engine is indicated at 4 and the aeroplane propeller is indicated at 5. At the rear of the engine is a supercharger 6 which may be driven through gearing from the end of the crank shaft, a magneto 7, and a carburetor 8. The construction so far described is to be taken as typical of any suitable aircraft engine of the radial air cooled type.

According to my invention, I provide a shield between the engine and the central portion of the propeller, which shield may extend beyond the outer ends of the cylinders or may terminate somewhat short thereof so as to leave the outer ends of the cylinders exposed directly to the air blast from the propeller. The shield is spaced from the front of the engine to provide a front pressure chamber between the shield and the engine. I then provide means for effecting flow of air from the propeller blast and from the atmosphere, due to forward movement of the aeroplane to such pressure chamber, to build up in said chamber by conversion of velocity into pressure, a pressure higher than the static pressure existing in the surrounding atmosphere, and approximately equal in magnitude to the total pressure which would be obtained from a tube located at the outer diameter of said shield, and pointing directly into the air stream, and means for withdrawing air from the region at the rear of the engine to maintain in this region a static pressure lower than the absolute pressure existing in the surrounding atmosphere. By this means a large effective flow of air over the cylinders is obtained, due entirely to the difference in pressures between the front and rear of the engine cylinders.

According to the embodiment of the invention illustrated in the drawing, I entirely enclose the engine in a suitable casing 9 which at its center is closed except for opening 10 through which the engine shaft projects. Arranged around the periphery of casing 9 and as far as possible from the center of the engine, are a plurality of inlet ducts or scoops 11 through which air may flow to the interior of casing 9. The inlet ducts or scoops are placed as far as possible from the center of the casing so that there is obtained the advantage of the propeller pitch and the forward motion of the aeroplane to force air through the ducts or scoops into the casing. The rear wall 12 of casing 9 is provided with a plurality of openings 13 adapted to be closed by shutters 14. The shutters are connected to and positioned by an operating arm 15. In the lower wall 16 of casing 9, at the rear of the engine, is provided a fan for withdrawing air from the space in casing 9 at the rear of the engine. Any suitable type of fan driven by any suitable means may be utilized.

Preferably I utilize a fan driven by an exhaust gas turbine wheel. In the present instance the fan comprises a casing 17 in which is supported a bearing 18 which carries a shaft 19. On the upper end of shaft 19 is a suitable blower or impeller wheel 20 which is adapted to draw air in through inlet 21 and discharge it through diffuser vanes 22 to a discharge opening 23, the discharge opening facing rearwardly. On the lower end of shaft 19 is a turbine wheel 24 having buckets 25 to which exhaust gases are supplied by a nozzle ring 26 carried by a nozzle box 27. Exhaust gases from the engine are supplied to nozzle box 27 through an exhaust conduit 28. The flow of exhaust gases to the nozzle box is controlled by a valve 29 located in a branch conduit 30. When valve 29 is open, exhaust gases pass for the most part directly to the atmosphere, but little exhaust gas being directed to the turbine wheel. As valve 29 is moved toward closed position, more and more of the exhaust gases are directed to the turbine wheel. When the valve is entirely closed, all the gases are directed thereto. This is a known arrangement for controlling an exhaust gas driven turbine, and is illustrated only diagrammatically. The speed of the blower may be controlled by the provision of the gas turbine independently of the engine speed, the control of the valve 29 being independent of the engine control. Thus, the gas turbine represents in substance a variable speed motor for driving the blower independent of the engine speed.

From the above described arrangement, it will be seen that casing 9 provides a pressure chamber 31 in front of the engine and a chamber 32 at the rear of the engine and that these chambers are connected to each other through the relatively restricted spaces between the engine cylinders. The fan 20 serves to withdraw air from the chamber 32, thus tending to lower the pressure and effect a flow of air from chamber 31 to chamber 32.

When it is desired to use the fan 20 for cooling purposes, the shutters 14 are closed and the fan operated at the desired speed by the gas turbine. This serves to withdraw air from the chamber 32, thus reducing the pressure therein. At the same time the flow of air from the propeller 5 and the forward motion of the aeroplane forces air through the ducts or scoops 11 and effects the building up of a higher static pressure in the forward chamber. As a result, there is a flow of air from chamber 31 over the engine cylinder to chamber 32, thus effecting cooling of the engine.

When it is desired not to use the fan or blower 20 for cooling, the shutters 14 may be opened, whereby air may flow through ducts or scoops 11 to chamber 31 and from chamber 31 past the engine cylinders and out directly through the openings 13. At this time, valve 29 may be open so that the exhaust gases pass directly to the atmosphere.

By my invention, I provide a construction whereby the flow of air from the propeller and the forward motion of the aeroplane effects a flow of a maximum amount of air over the engine cylinders, thereby providing efficient cooling of the engine.

What I claim as new and desire to secure by Letters Patent of the United States, is:

1. The combination with a radial type aeroplane engine and a propeller at the front of the engine, of a casing enclosing the engine and defining a chamber in front of the engine and a chamber at the rear of the engine communicating with the front chamber, the casing being provided at its front peripheral portion with passage means for conveying air from the propeller into the front chamber, means providing passages for flow of air from the rear chamber to the atmosphere, adjustable means for completely closing and opening said passages, a blower for exhausting air from said casing, and a speed adjustable gas turbine for operating the blower.

2. In combination, a radial type aircraft internal combustion engine, a casing enclosing the engine and defining a front chamber and a rear chamber connected by passages of restricted area between engine cylinders, a propeller on the engine shaft in front of said casing, means consisting of ducts in the front wall of the casing adjacent to the periphery of the engine for conveying air from the propeller to the front chamber, a blower for withdrawing air from the rear chamber, a speed adjustable motor for driving the blower, means providing a passage for conveying air from the rear chamber directly to atmosphere, and valve means for opening and completely closing said passage.

3. In combination, an internal combustion engine, a propeller at the front of the engine, walls surrounding the periphery of the engine and defining a chamber at the rear of the engine, passages of restricted area between engine cylinders extending from the front of the engine to said chamber at the rear of the engine, centrifugal blower means for maintaining a relatively low static pressure in said rear chamber, a speed adjustable gas turbine for driving the blower, means providing passage for conveying air from the rear chamber directly to atmosphere, and valve means for opening and completely closing said passage to control the cooling of the engine during variations of the speed of the engine and the operation of the blower means.

SAMUEL R. PUFFER.